(12) United States Patent
Anuskiewicz et al.

(10) Patent No.: US 10,189,032 B2
(45) Date of Patent: Jan. 29, 2019

(54) SPRINKLER VALVE MODULE WITH REMOVABLE VALVE SEAL

(71) Applicant: Hunter Industries, Inc., San Marcos, CA (US)

(72) Inventors: Ronald Henry Anuskiewicz, San Diego, CA (US); Michael A. Huelsman, Carlsbad, CA (US); David W. Davidson, Del Mar, CA (US)

(73) Assignee: Hunter Industries, Inc., San Marcos, CA (US)

( * ) Notice: Subject to any disclaimer, the term of this patent is extended or adjusted under 35 U.S.C. 154(b) by 47 days.

(21) Appl. No.: 15/407,938

(22) Filed: Jan. 17, 2017

(65) Prior Publication Data

US 2018/0200737 A1    Jul. 19, 2018

(51) Int. Cl.
*F16K 1/46* (2006.01)
*B05B 1/30* (2006.01)
*F16K 1/32* (2006.01)

(52) U.S. Cl.
CPC .............. *B05B 1/3013* (2013.01); *F16K 1/32* (2013.01); *F16K 1/46* (2013.01)

(58) Field of Classification Search
CPC ......... F16K 1/32; B05B 15/70; B05B 3/0422; B05B 1/3033; B05B 1/3013
See application file for complete search history.

(56) References Cited

U.S. PATENT DOCUMENTS

| | | | |
|---|---|---|---|
| 1,776,455 A | 9/1930 | Thompson | |
| 2,833,299 A | 5/1958 | Frederick | |
| 4,355,197 A | 10/1982 | Jonsson | |
| 4,637,548 A | 1/1987 | Ray | |
| 4,729,511 A | 3/1988 | Citron | |
| 4,781,327 A | 11/1988 | Lawson | |
| 4,809,910 A | 3/1989 | Meyer | |
| 4,913,351 A | 4/1990 | Costa | |
| 5,711,486 A | 1/1998 | Clark | |
| 5,720,435 A | 2/1998 | Hunter | |
| 5,762,270 A | 6/1998 | Kearby | |
| 5,871,156 A | 2/1999 | Lawson | |
| 5,899,386 A | 5/1999 | Miyasato | |
| 5,927,607 A | 7/1999 | Scott | |
| 5,979,482 A | 11/1999 | Scott | |
| 6,186,413 B1 | 2/2001 | Lawson | |
| 6,227,455 B1 | 5/2001 | Scott et al. | |
| 6,491,235 B1 | 12/2002 | Scott et al. | |
| 6,854,664 B2 | 2/2005 | Smith | |
| 7,303,147 B1 | 12/2007 | Danner et al. | |
| 8,430,376 B1 | 4/2013 | Danner et al. | |
| 2016/0319938 A1* | 11/2016 | Lind et al. | ................ F16K 1/32 |

* cited by examiner

*Primary Examiner* — Kevin Lee
(74) *Attorney, Agent, or Firm* — Knobbe Martens Olson & Bear LLP

(57) ABSTRACT

A valve module for an irrigation sprinkler can include an upper valve support housing and a lower support basket removably connected to the valve support housing. The module can include a valve member reciprocable within the valve support housing to engage and disengage a valve seat in the support basket. The valve member can include a piston and valve seal removably attached to the piston and configured to be serviced or replaced separate from the piston when removed from the piston.

22 Claims, 9 Drawing Sheets

Section A-A with valve opened

Section A-A with valve opened

Section A-A with valve closed

Section B-B

SPRINKLER VALVE MODULE WITH REMOVABLE VALVE SEAL

BACKGROUND

Technical Field

The present inventions relate to sprinklers used to irrigate lawns, gardens and landscaping, and more particularly, to so-called valve-in-head sprinklers that have built in valves for turning ON and OFF the application of water by the sprinkler.

Description of the Related Art

Irrigation systems used in homes typically comprise a garage-mounted electronic controller that selectively turns a plurality of solenoid actuated valves ON and OFF in accordance with a pre-programmed watering schedule. The valves admit water to subterranean PVC pipes having several spray, rotor-type or drip-type sprinklers attached to the pipes at spaced intervals. The solenoid actuated valves are usually housed together in a plastic valve box buried near the electronic controller.

In some environments, such as golf courses, so called "valve-in-head" sprinklers are preferred. They have a diaphragm valve built into the lower end thereof which is typically actuated by a solenoid mounted in the sprinkler itself that opens and closes a pilot valve. Each valve-in-head sprinkler on a golf course can thus be individually actuated by an electronic controller usually mounted a considerable distance away.

In U.S. Pat. No. 6,491,235 of Scott et al., assigned to Hunter Industries, Inc., there is disclosed a valve-in-head sprinkler that has a top serviceable diaphragm module. The diaphragm valve module can be readily replaced without excavation and removal of the entire sprinkler if the diaphragm valve module is worn, damaged by grit or otherwise defective, e.g. if there is leakage from the top of the outer sprinkler case when the valve is in its OFF state. The telescoping riser that contains the nozzle, turbine and gear drive train is first removed from the outer sprinkler case. The diaphragm valve module, which is mounted in the lower end of the outer sprinkler case, can then be withdrawn and replaced.

Valve-in-head sprinklers typically operate at a relatively high pressures, e.g. over one hundred PSI, and in some cases as high as two hundred PSI. When the valve is in its CLOSED or turbine state such high water pressures place substantial strains on the mechanical components which can lead to failures. It would be desirable to have an improved replaceable valve module for a valve-in-head sprinkler that alleviates this problem.

SUMMARY

The present disclosure provides a valve module for removable installation inside the outer case of a sprinkler after removal of a riser with a nozzle turret normally mounted for reciprocation within the case. The module includes a field serviceable and replaceable valve seal. The valve seal can be removable from a piston portion of the valve module. Removing the valve seal from the piston can facilitate servicing or replacement of the valve module without replacement of the remainder of the piston.

According to some embodiments, a valve module for an irrigation sprinkler includes an upper valve support housing. The valve module can include a lower support basket removably connected to the valve support housing. In some embodiments, the valve module includes a valve member reciprocable within the valve support housing to engage and disengage a valve seat in the support basket. The valve member can include a piston and a valve seal removably attached to the piston. The valve seal can be configured to be serviced or replaced separate from the piston when removed from the piston.

In some embodiments, the valve module includes a filter removably attached to the piston.

In some embodiments, the valve module includes a diaphragm connected to the upper support housing to the piston.

In some embodiments, the lower support basket is configured to reciprocate with respect to the upper valve support housing in a direction parallel to the direction in which the valve member reciprocates within the valve support housing.

In some embodiments, the valve seal comprises a rigid body and an elastomeric seal connected to the rigid body.

In some embodiments, the elastomeric seal is overmolded onto the rigid body.

In some embodiments, the valve seal is attached to piston via one or more fasteners.

In some embodiments, the valve module includes a metering pin, wherein the valve seal and the piston each surround a portion of the metering pin.

In some embodiments, the piston is connected to the upper valve support housing.

In some embodiments, the piston is connected to the upper valve support housing via an elastomeric diaphragm.

According to some variants, a valve member for an irrigation sprinkler includes a valve support housing that can be configured to be positioned in an upstream end of a sprinkler housing. The valve member can include a basket removably attached to the valve support housing and that can be configured to move along a movement axis between a first and second position with respect to the valve support housing. In some embodiments, the valve member includes a piston connected to the valve support housing and positioned between the basket and the valve support housing. The piston can be configured to move along the movement axis between an opened position and a closed position. In some embodiments, the valve member includes a seal assembly connected to the piston and configured to sealingly engage with a valve seat when the piston is in the closed position. The seal assembly can be configured to release from the piston to facilitate servicing or replacement of the seal assembly separate from the piston.

In some embodiments, the valve seat is connected to the basket.

In some embodiments, the piston comprises an extended tube portion extending in an upstream direction.

In some embodiments, the seal assembly surrounds a portion of the extended tube when the seal assembly is connected to the piston.

In some embodiments, the valve member includes a spring positioned between and in contact with the valve support housing and the piston, the spring configured to bias the piston to the closed position.

In some embodiments, the valve member includes a filter surrounding a portion of the piston.

In some embodiments, the seal assembly is removable from the piston without requiring disconnection of the piston from the valve support housing.

In some embodiments, the seal assembly is connected to the piston via one or more fasteners.

In some embodiments, the seal assembly is positioned on a side of the piston opposite the valve support housing

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

Figure 1:
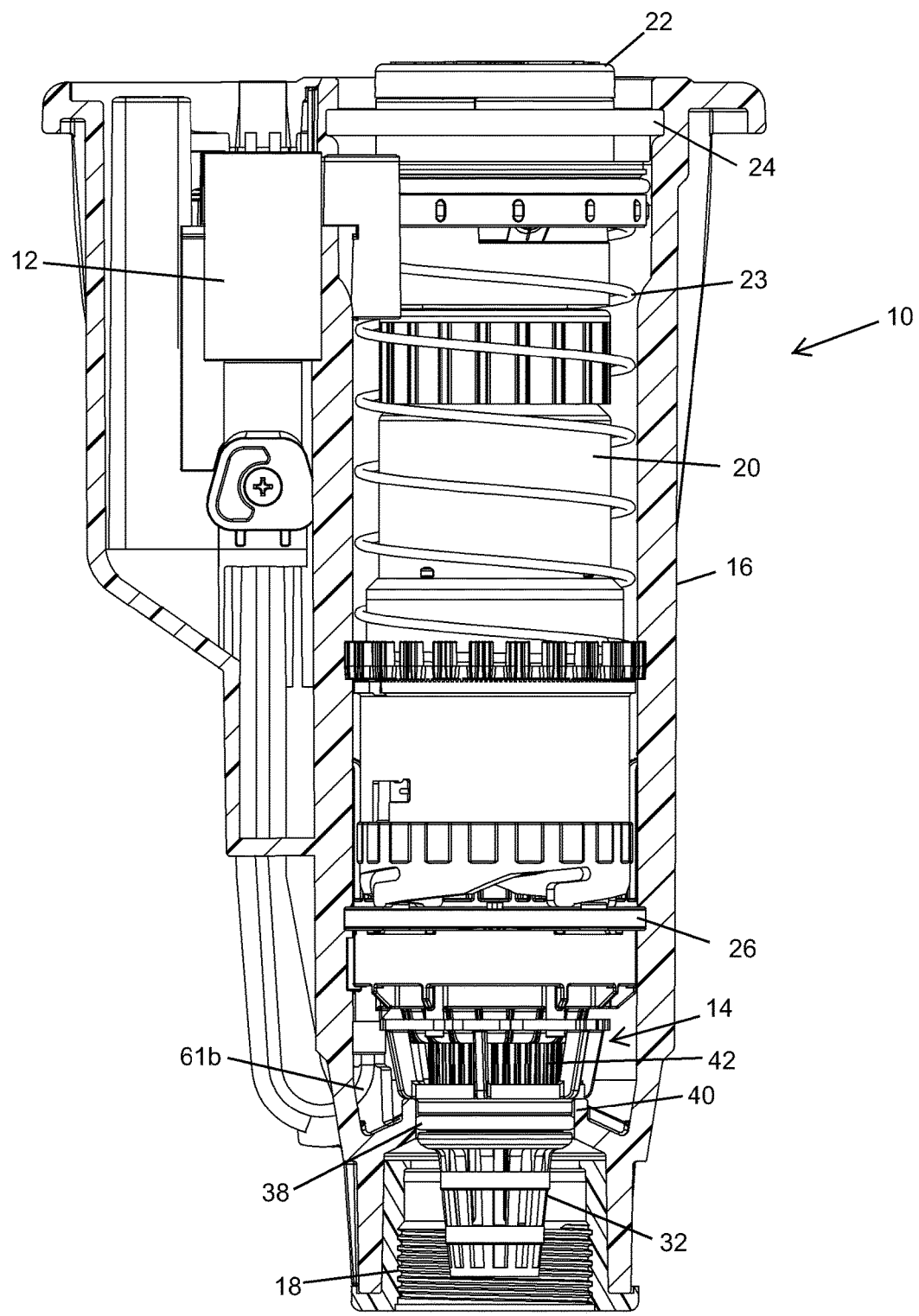
FIG. 1 is a part vertical section, part side elevation view of a valve-in-head sprinkler with a replaceable valve module in accordance with an embodiment of the present inventions.
Figure 2:
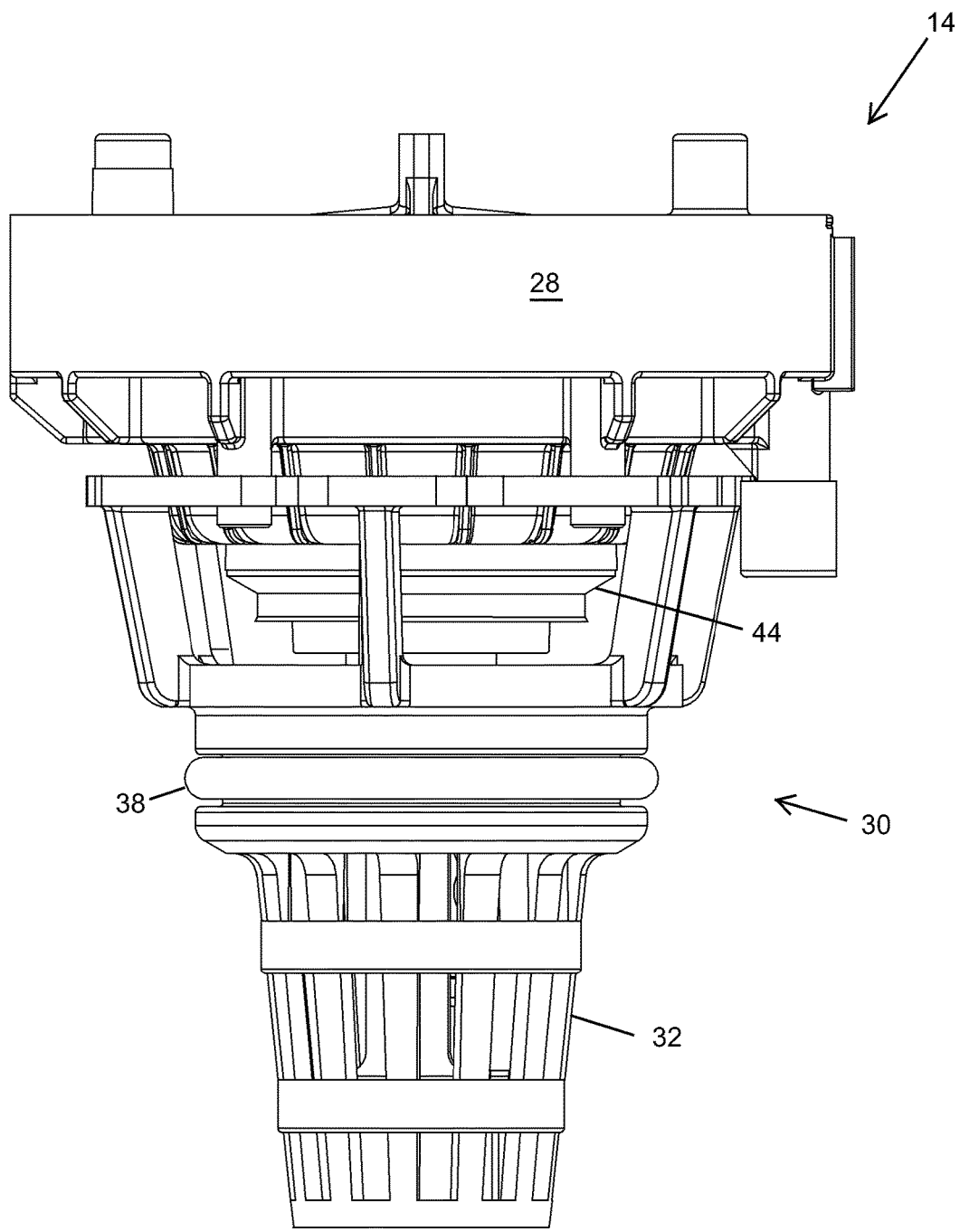
FIG. 2 is an enlarged side elevation view of the valve module of the sprinkler of FIG. 1 illustrating its valve in an OPEN state.

The drawing showing certain embodiments can be semi-diagrammatic and not to scale and, particularly, some of the dimensions are for the clarity of presentation and are shown greatly exaggerated in the drawings.

DETAILED DESCRIPTION

Referring to FIG. 1, a valve-in-head rotor type sprinkler 10 includes a valve actuator component assembly 12 and a top serviceable valve module 14. The valve module 14 is mounted in the lower end of an outer case 16 having a female threaded inlet 18. A riser 20 is vertically reciprocable within the outer case 16 when the valve module 14 is opened and closed. A nozzle head or turret 22 is rotatably mounted at the upper end of the riser 20. The riser 20 is held in its retracted position by a coil spring 23 held in place by an upper snap ring 24. A turbine (or other impeller such as a ball drive), gear reduction, and reversing mechanism (not visible) are mounted in the riser 20 and rotate the nozzle turret 22 through an adjustable arc, as well known in the art. A lower snap ring 26 releasably holds the valve module 20 in position within the lower end of the outer case 16. Although the illustrated sprinkler 10 has a rotatable nozzle turret and reciprocable riser, the valve module 14 may be utilized with a sprinkler having only one or neither of these features. For example, the valve module 14 may be used with a fixed (e.g., non-reciprocable) riser or with a non-rotatable nozzle.

Figure 3:
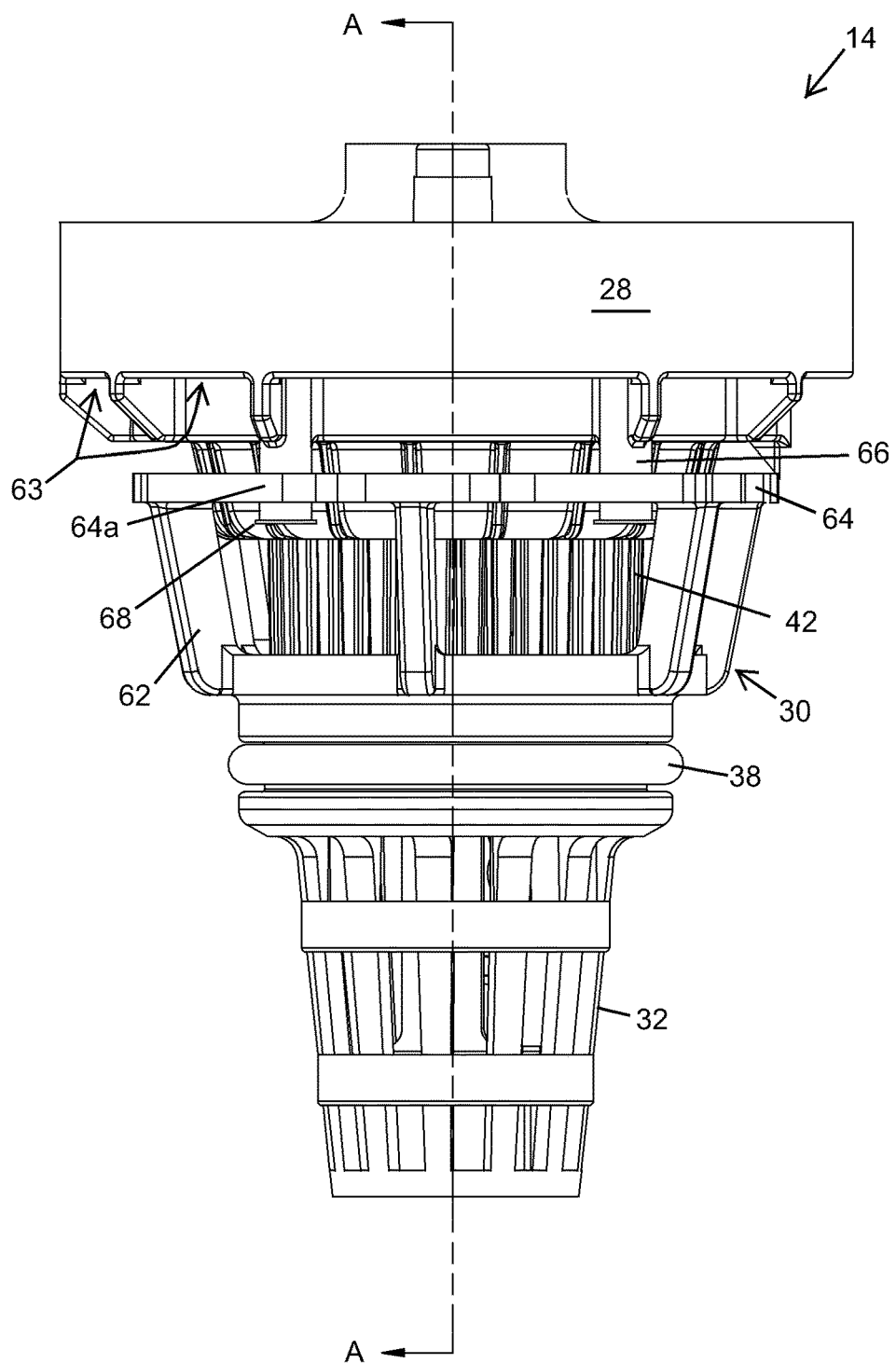
FIG. 3 is an enlarged side elevation view of the valve module of the sprinkler of FIG. 1 illustrating its valve in a CLOSED state.
Figure 4:
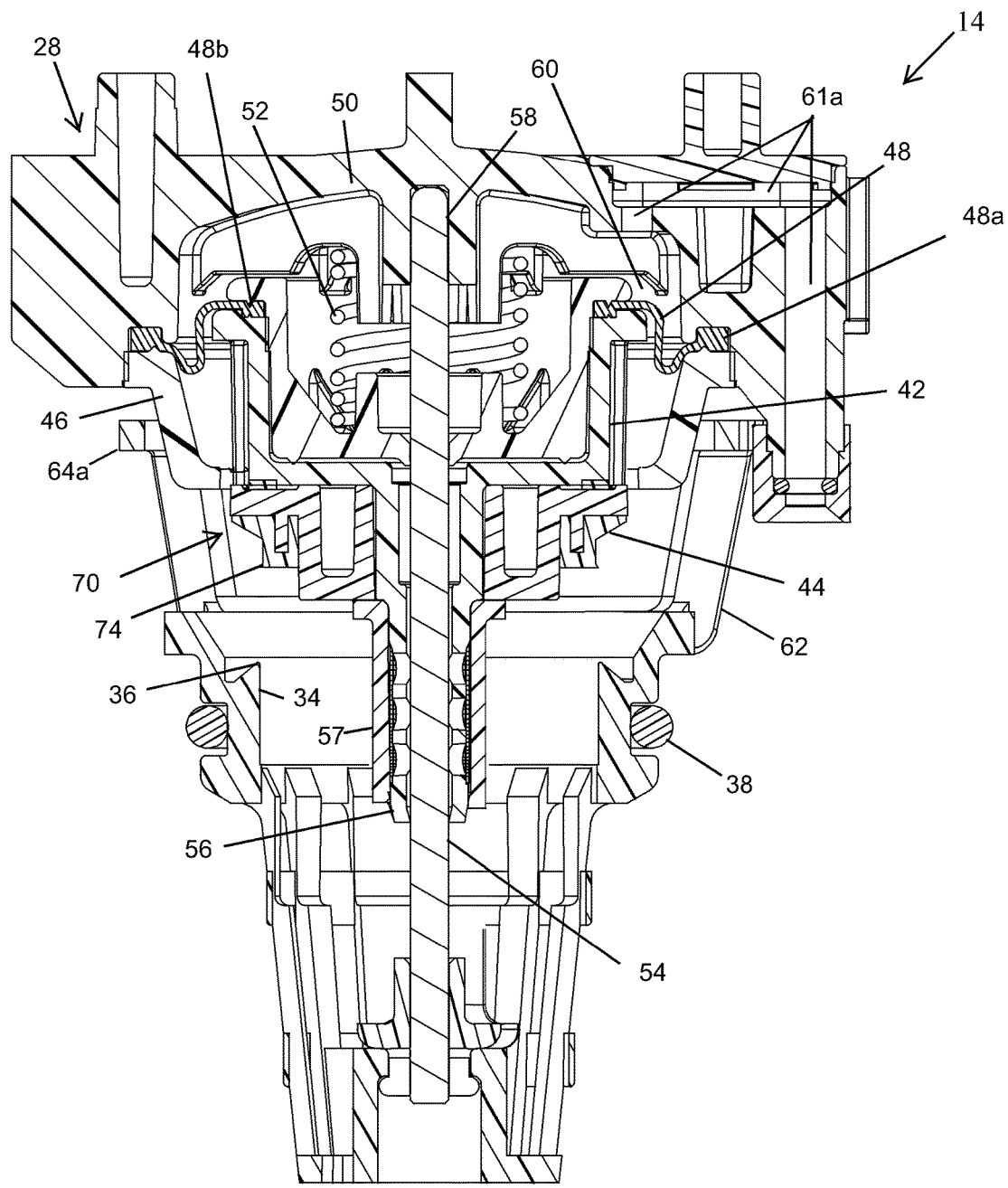
FIG. 4 is an enlarged vertical sectional view of the valve module of the sprinkler of FIG. 1 illustrating its valve in an OPEN state, taken along the cut plane A-A of FIG. 3.
Figure 5:
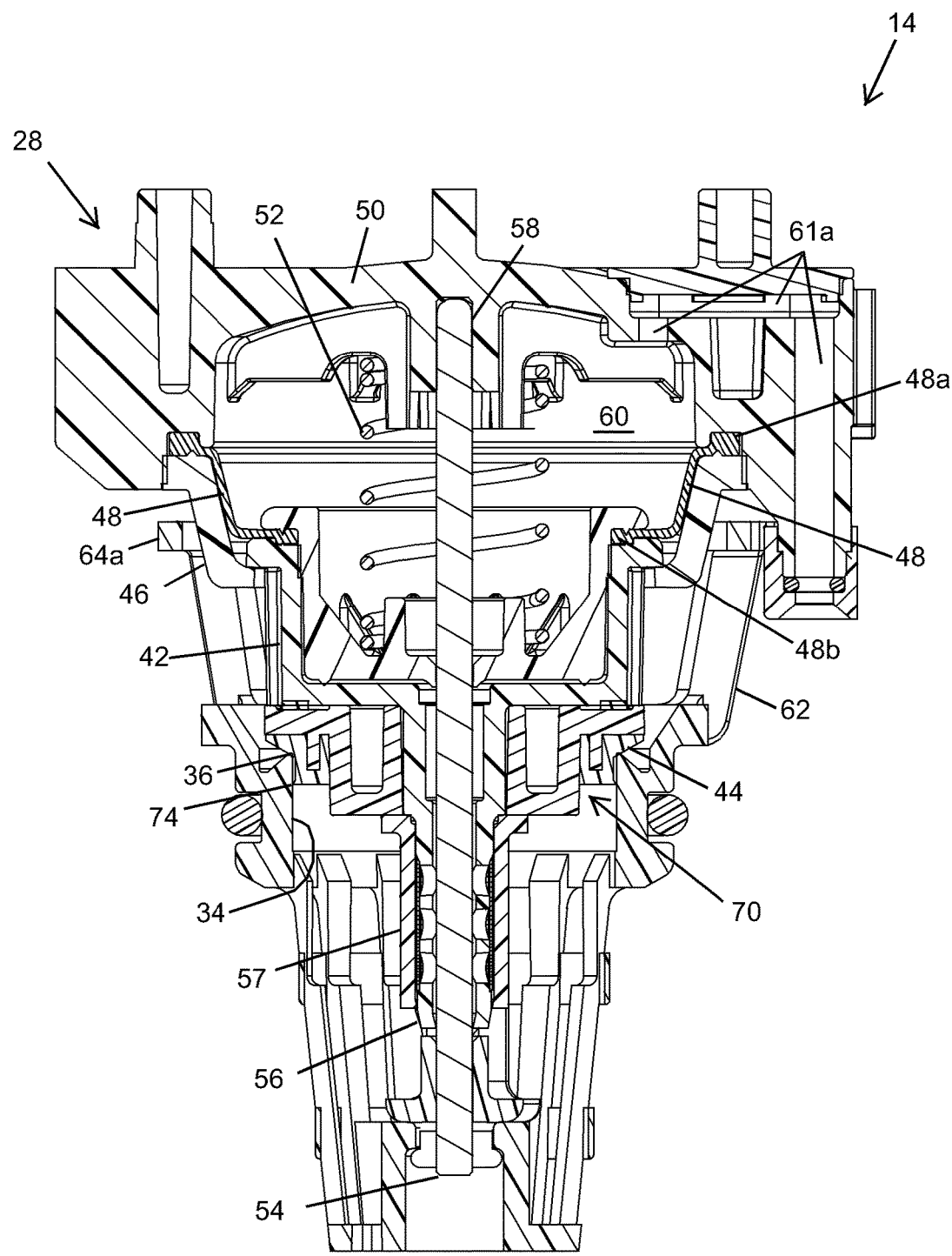
FIG. 5 is a vertical sectional similar to FIG. 4 illustrating the valve of the module in a CLOSED state, taken along the cut plane A-A of FIG. 3.

FIGS. 2-6 illustrate details of the valve module 14. The valve module 14 includes a generally cylindrical upper valve support housing 28 and a lower valve seat support basket 30 connected to the underside of the upper valve support housing 28. The valve seat support basket 30 is formed with a filter screen 32 at its lower end. The filter screen 32 can have a frusto-conical, conical, or other shape. A cylindrical upper section 34 of the valve support basket 30 has an upper end that forms a valve seat 36 (FIG. 4). An O-ring 38 made of suitable elastomeric material provides a seal between the valve seat support basket 30 and a shoulder 40 (FIG. 1) of the outer case 16.

A piston valve member 42 is vertically (e.g., parallel to an axis of rotation of the nozzle turret and/or perpendicular to a longitudinal axis of the outer case 16) reciprocable within the support housing 28. A radially (e.g., perpendicular to the axis of rotation of the nozzle turret and/or perpendicular to the longitudinal axis of the outer case 16) extending valve seal face 44 made of suitable elastomeric material extends across the lower end of the piston valve member 42. The valve seal face 44 is configured to be moved into and out of sealing engagement with the valve seat 36 when the valve module 14 is transitioned between a CLOSED and OPEN position. The piston valve member 42 slides up and down through an aperture in a guide member 46. The outer periphery 48a of a flexible elastomeric diaphragm 48 is locked between the guide member 46 and the valve support housing 28. The inner periphery 48b of the diaphragm 48 is locked between the inner and outer sections of the piston valve member 42. A coil spring 52 is captured between the center and the cap portion 50 of the valve support housing 28 and the bottom of the inner section of the piston valve member 42 to bias the piston valve member to its lower CLOSED position illustrated in FIG. 5. A metering pin 54 extends through an extended tube portion 56 of the piston valve member 42. The metering pin 54 extends axially through the center of the piston valve member 42 and its upper end is captured in a socket 58 formed in the underside of the center of the cap portion 50. A filter 57 surrounds the tube portion 56. The filter 57 is a slight interference fit to at least a part of the tube portion 56 and may be easily removed, cleaned, and replaced by a user. Clean water moves through the filter 57 and through the holes 59 to the area surrounding the metering pin 54. All of the components of the diaphragm valve module 14 are removable as unit from the upper end of the outer case 16 upon removal of the riser 20 which may require removal of the snap rings 24 and 26.

The valve actuator component assembly 12 (FIG. 1) can be actuated to vent water from the chamber 60 (FIG. 5) between the upper side of the diaphragm 48 and the cap portion 50 through a pilot hole passage 61a (FIG. 4) connected via tube 61b (FIG. 1). The piston valve member 42 then moves from its lower CLOSED position illustrated in FIG. 5 to its upper OPEN position illustrated in FIG. 4. This disengages the valve seal face 44 from the valve seat 36 allowing water to flow through the inlet 18, through the filter screen 32 and out of the valve support basket 30. When the water leaves the valve seat support basket 30 it flows between vertically extending ribs 62 of the valve seat support basket 30 and through a plurality of circumferentially spaced flow passages 63. This water then flows into the open lower end of the riser 20 and exits from the nozzle turret 22 in an inclined stream.

The valve seat support basket 30 (FIGS. 2-5) is connected to the valve support housing 28 in a manner such that the valve seat 36 can reciprocate vertically relative to the valve support housing 28. By way of example only, the amount of reciprocation of the valve seat support basket 30 may be less than five millimeters. This greatly reduces the mechanical stress and loading on the ribs 62 and other components of the diaphragm valve module 14 when the diaphragm valve module 14 is in its closed or OFF state illustrated in FIGS. 3 and 5. The valve seat support basket 30 is connected to the upper valve support housing 28 by a retaining ring 64 (FIG. 6) with one or more (e.g., four, as illustrated) flanges 64a having apertures that slide vertically over circumferentially spaced vertical retaining posts 66. The retaining posts 66 vertically extend from the underside of the valve support housing 28. FIG. 3 and illustrates the slightly raised position of the valve seat support basket 30 when the diaphragm valve module 14 is in its OPEN state.

The retaining posts 66 retain the valve seat support basket 30 in a manner such that the valve support basket 30 is only under light spring tension from the spring 52 when the diaphragm valve module 14 is not yet installed in the outer case 16. The valve seat 36 is capable of independent movement relative to the valve support housing 28 so that the closing forces generated by the piston valve member 42 do not apply unwanted loading on the various components of the valve support basket 30 under relatively high water pressures (e.g. over one hundred PSI). When the diaphragm valve module 14 goes to its CLOSED state, the valve support basket 30 is forced downwardly until it stops against the upper end of shoulder 40 (FIG. 1). The valve support housing 28 in turn moves upwardly until it stops against the underside of lower snap ring 26. The top of the valve support housing has projections (not visible) that lock the lower snap ring 26, providing a safety feature to prevent unsafe removal of the lower snap ring 26 when the sprinkler 10 is pressurized. The ability of the valve seat support basket 30 to reciprocate downwardly when the pressurized water to the sprinkler 10 is turned OFF allows the lower snap ring to be unlocked and removed. The valve seat support basket 30 can be readily disassembled from the upper valve support housing 28 for replacement if the valve seat 36 is damaged, or to access the removable valves seal assembly 70. The flanges 64a of the retaining ring 64 are formed with key-hole shaped slots 82 so that they can snap around corresponding flared posts 68. When snapped into the assembled position, the hole portion 84 of each key-hole slot 82 is dimensioned to provide a loose fit to its corresponding flared retaining post 68, to allow the lower valve seat basket 30 to reciprocate relative to the upper valve support housing 28. If the valve seat 36 is damaged the lower valve seat support basket 30 and the integrally formed valve seat 36 can readily be removed and replaced by simply untwisting this structure clockwise and removing it from the upper valve support housing 28. This same removal feature can be used to remove rocks and other debris captured within the filter screen 32 and to access the removable valves seal assembly 70.

Referring to FIGS. 6-10 the valve seal face 44 is one portion of a replaceable and serviceable valve seal assembly 70. The valve seal assembly includes a support cage 72. The support cage is formed of a semi rigid plastic, although it may also be a non-corrosive metal, such as stainless steel, or any other rigid, or semi rigid material. The seal face 44 is part of a flexible seal 73 that is connected to the support cage 72 (e.g., via over-molding, welding, adhesives, and/or some other connection method or structure). The flexible seal 73 also includes a raised velocity control portion 74 with recessed flow cutouts 76. The velocity control portion moves into and out of the cylindrical upper section 34 and limits the amount of water that can flow though the valve during the initial opening and final closing of the valve. This reduced flow helps prevent hydraulic shock to the sprinkler riser, such as a water hammer effect. The reduced hydraulic shock can facilitate extending the life of the sprinkler. The flexible seal may also include a lower surface 82. With this feature, the flexible seal 73 at least partially encapsulates each of the cage ribs 80. I some embodiments, the flexible seal may fully encapsulate the cage ribs 80 or it may only cover a part of the ribs 80. In one embodiment, the flexible seal 73 is over molded to the cage 72. In other embodiments, the flexible seal 73 may be formed separately from the cage 72 and may be snapped, pressed, glued, or otherwise attached to the cage 72.

Figure 6:
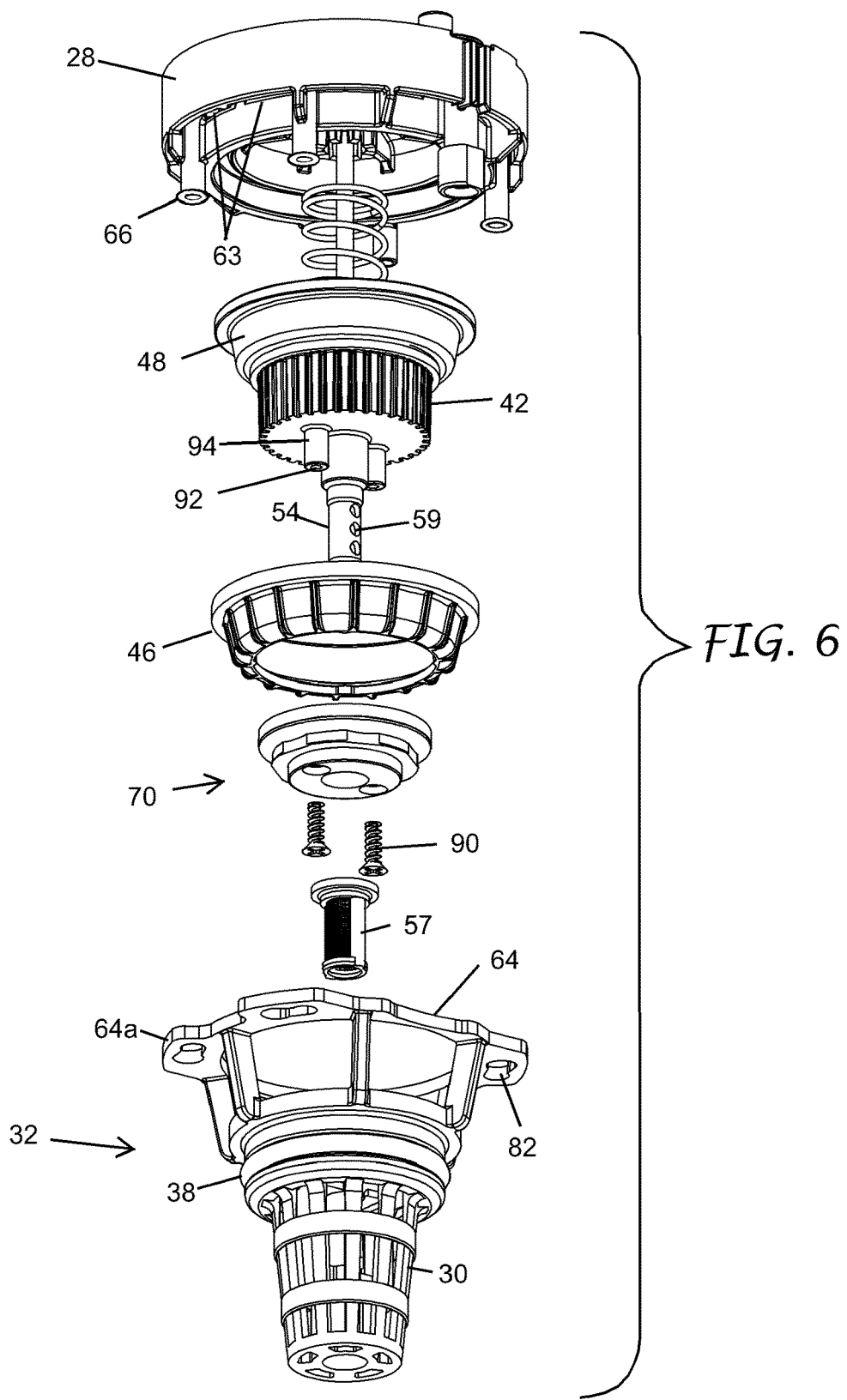
FIG. 6 is an exploded view of the valve module of the sprinkler of FIG. 1.
Figure 7:
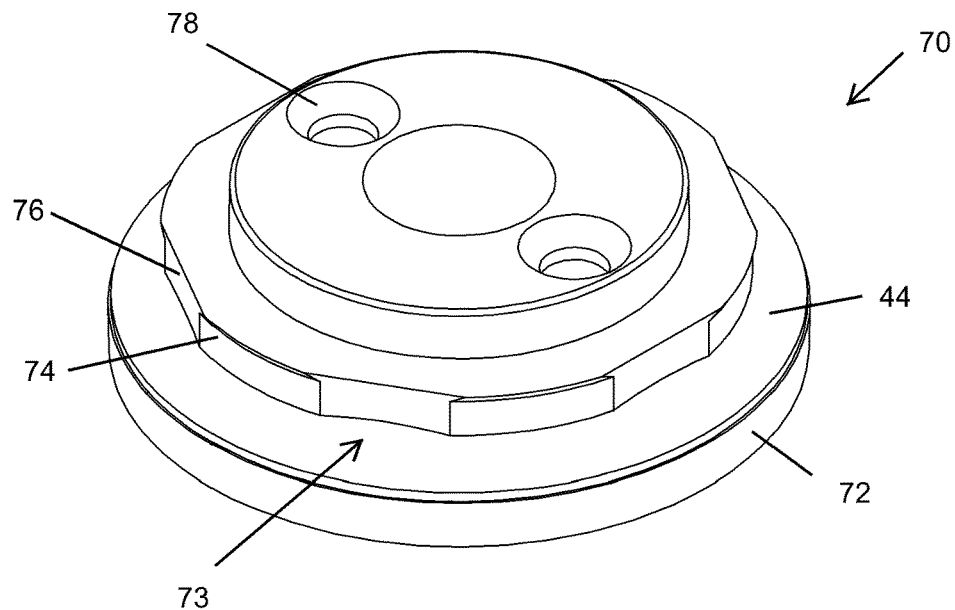
FIG. 7 is an enlarged view of a valve seal viewed from the sealing side.
Figure 8:
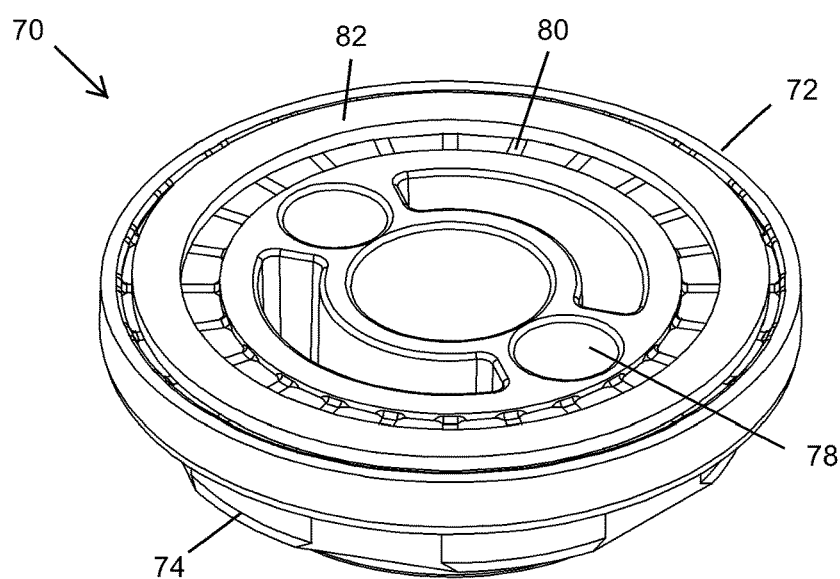
FIG. 8 is an enlarged view of a valve seal viewed from the structural support side.
Figure 9:
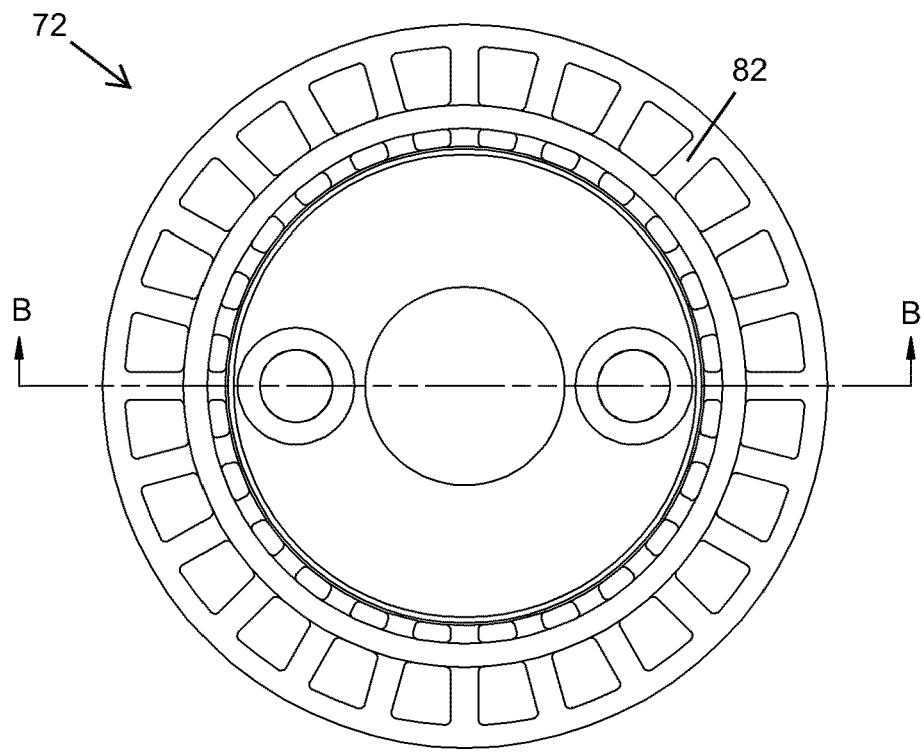
FIG. 9 is a top view of a seal support structure.
Figure 10:
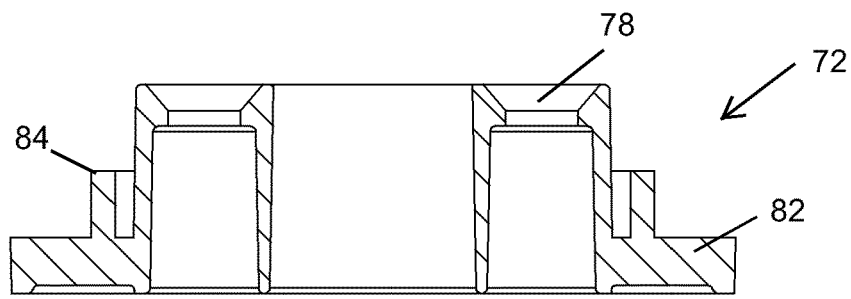
FIG. 10 is a sectioned side view of a seal support structure, taken along the cut plane B-B of FIG. 9.
Figure 11:
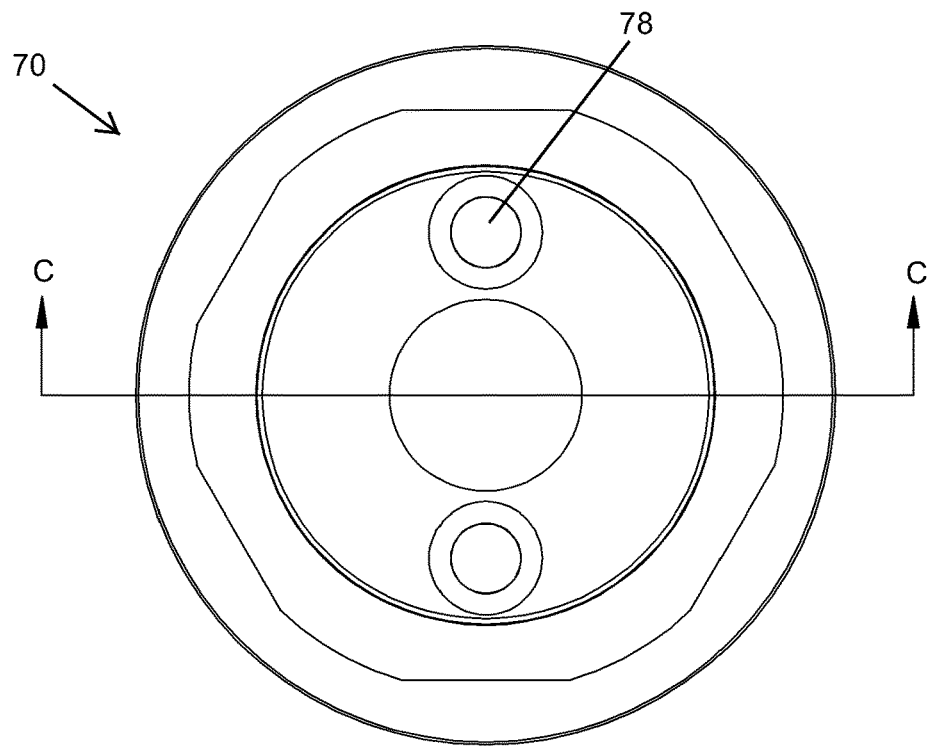
FIG. 11 is a top view of a valve seal.
Figure 12:
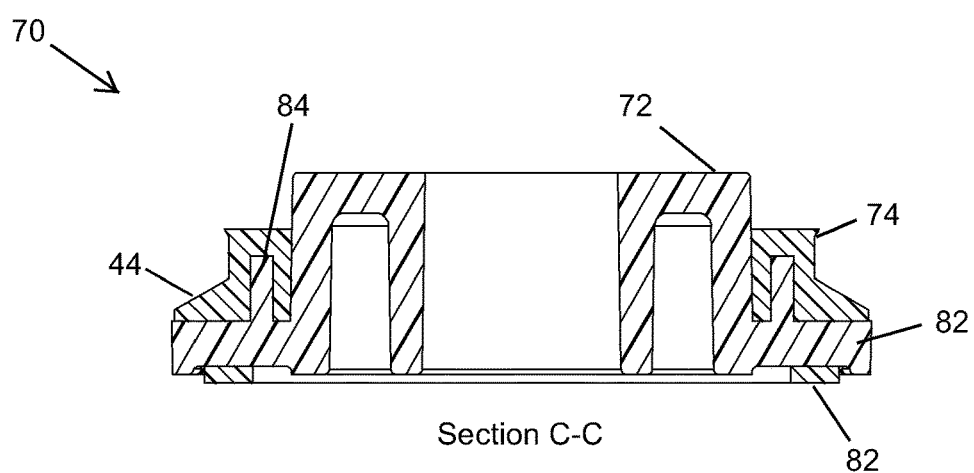
FIG. 12 is a sectioned side view of a valve seal, taken along the cut plane C-C of FIG. 11.

In some embodiments, the valve seal assembly 70 may be removably attached to the piston valve member 42. For example, the valve seal assembly 70 may be attached to the piston valve member 42 via one or more fasteners, bayonet fittings, threading, friction fittings, detents, and/or other releasable attachment structures or methods. In some embodiments, the valve seal assembly may include mounting holes 78. As best seen in FIG. 6, the piston valve member 42 may include at least one boss 94 extending from its lower surface. In some embodiments, the piston valve member may include two bosses 94. In some embodiments, the piston valve member may include more than two bosses 94. At least one of the bosses 94 maybe formed with an attachment hole 92 extending at least partially in the boss 94. In some embodiments, the piston valve member 42 may include two bosses 94 each with an attachment hole 92 formed within. At least one screw 90 may be inserted through the at least one mounting hole 78 and be threaded into the at least one attachment hole 92 to hole the valve seal assembly to the piston valve member 42.

While we have described an embodiment of the present inventions, it should be understood that the sprinkler and diaphragm valve module can be modified in both arrangement and detail. For example, our inventions can be implemented in a valve-in-head sprinkler that does not have a removable diaphragm valve module. The valve inside the valve module 14 need not include a diaphragm and could instead utilize only a piston. The filter screen 32 could be configured to be detachable from the lower end of valve seat support basket 30 via threads, snap fit projections or a bayonet attachment scheme, for example. The valve seat 36 could be a separate ring threaded into the upper portion of the valve seat support basket 30. Therefore, the protection afforded our inventions should only be limited in accordance with the scope of the following claims.

What is claimed is:

1. A valve module forming a subassembly for installation of the subassembly into an outer case of an irrigation sprinkler, the valve module comprising:
   an upper valve support housing;
   a lower support basket removably connected to the upper valve support housing to form the subassembly; and
   a valve member reciprocable in a direction within the subassembly to engage and disengage a valve seat in the lower support basket, the valve member comprising a piston and a valve seal removably attached to the piston, the valve seal further being configured to be serviced or replaced separate from the piston.

2. The valve module of claim 1, comprising a filter removably attached to the piston.

3. The valve module of claim 1, comprising a diaphragm connected to the upper valve support housing and the piston.

4. The valve module of claim 1, wherein the lower support basket is configured to reciprocate with respect to the upper valve support housing in a direction parallel to the direction in which the valve member reciprocates within the subassembly.

5. The valve module of claim 1, wherein the valve seal comprises a rigid body and an elastomeric seal connected to the rigid body.

6. The valve member of claim 5, wherein the elastomeric seal is over-molded onto the rigid body.

7. The valve member of claim 1, wherein the valve seal is attached to the piston via one or more fasteners.

8. The valve member of claim 1, comprising a metering pin, wherein the valve seal and the piston each surround a portion of the metering pin.

9. The valve member of claim 1, wherein the piston is connected to the upper valve support housing.

10. The valve member of claim 9, wherein the piston is connected to the upper valve support housing via an elastomeric diaphragm.

11. A valve member for an irrigation sprinkler, comprising:
- a valve support housing configured to be positioned in an upstream end of a sprinkler housing;
- a basket removably attached to the valve support housing and configured to move along a movement axis between a first and second position with respect to the valve support housing;
- a piston connected to the valve support housing and positioned between the basket and the valve support housing, the piston configured to move along the movement axis between an opened position and a closed position; and
- a seal assembly connected to the piston and configured to sealingly engage with a valve seat when the piston is in the closed position, the seal assembly further configured to release from the piston to facilitate servicing or replacement of the seal assembly separate from the piston.

12. The valve member of claim 11, wherein the valve seat is connected to the basket.

13. The valve member of claim 11, wherein the piston comprises an extended tube portion extending in an upstream direction.

14. The valve member of claim 13, wherein the seal assembly surrounds a portion of the extended tube portion when the seal assembly is connected to the piston.

15. The valve member of claim 11, comprising a spring positioned between and in contact with the valve support housing and the piston, the spring configured to bias the piston to the closed position.

16. The valve member of claim 11, comprising a filter surrounding a portion of the piston.

17. The valve member of claim 11, wherein the seal assembly is removable from the piston without requiring disconnection of the piston from the valve support housing.

18. The valve member of claim 11, wherein the seal assembly is connected to the piston via one or more fasteners.

19. The valve member of claim 11, wherein the seal assembly is positioned on a side of the piston opposite the valve support housing.

20. A valve module for an irrigation sprinkler comprising:
an upper valve support housing;
a lower support basket removably connected to the upper valve support housing; and
a valve member reciprocable in a direction within the upper valve support housing to engage and disengage a valve seat in the lower support basket, the valve member comprising a piston and a valve seal removably attached to the piston, the valve seal further being configured to be serviced or replaced separate from the piston,
wherein the lower support basket is configured to reciprocate with respect to the upper valve support housing in a direction parallel to the direction in which the valve member reciprocates within the upper valve support housing.

21. A valve module for an irrigation sprinkler comprising:
an upper valve support housing;
a lower support basket removably connected to the upper valve support housing; and
a valve member reciprocable in a direction within the upper valve support housing to engage and disengage a valve seat in the lower support basket, the valve member comprising a piston and a valve seal removably attached to the piston via one or more fasteners, the valve seal further being configured to be serviced or replaced separate from the piston.

22. A valve module for an irrigation sprinkler comprising:
an upper valve support housing;
a lower support basket removably connected to the upper valve support housing;
a metering pin; and
a valve member reciprocable in a direction within the upper valve support housing to engage and disengage a valve seat in the lower support basket, the valve member comprising a piston and a valve seal removably attached to the piston, the valve seal and the piston each surrounding a portion of the metering pin, the valve seal further being configured to be serviced or replaced separate from the piston.

* * * * *